3,770,789
PROCESS FOR MANUFACTURING ALKYLALUMINUM COMPOUNDS

Eiichi Ichiki, Kazuo Iida, Atsuro Matsui, and Hidekimi Kadokura, Niihama, Japan, assignors to Sumitomo Chemical Company, Limited, Osaka, Japan
No Drawing. Filed Feb. 16, 1971, Ser. No. 115,800
Claims priority, application Japan, Feb. 21, 1970, 45/14,944
Int. Cl. C07f 5/06
U.S. Cl. 260—448 A  11 Claims

ABSTRACT OF THE DISCLOSURE

Aluminum or its alloy is activated by heating aluminum or its alloy at 70°–200° C. in the presence of an activating agent comprising (1) a compound represented by the general formula $R_2AlX$, wherein R represents an alkyl, aryl, aralkyl or alkaryl group and X represents a hydrogen atom, an alkyl, aryl, aralkyl, alkaryl, alkoxy, aroxy, aralkoxy or alkaroxy group or a halogen atom, (2) a metal of Groups Ia and IIa of the Periodic Table or its compound, and (3) metallic copper or its compound.

---

This invention relates to a process for activating aluminum or its alloy used in the preparation of alkylaluminium compounds, and particularly to a process for activating aluminum or its alloy used in the preparation of alkylaluminums through a reaction of aluminum, alkylaluminum compounds and hydrogen or through a reaction of aluminum, alkylaluminum compounds, hydrogen and olefins.

The reaction for directly synthesizing alkylaluminum compounds through a reaction of aluminum, alkylaluminum compounds and hydrogen or through a reaction of aluminum, alkylaluminum compounds, hydrogen and olefins is well known (for example, Japanese Pat. No. 236,-648).

However, said reaction has such a disadvantage that the reaction rate is generally low, because the surface of aluminum is covered with an oxide film capable of repressing the reaction, though the aluminum itself is a very reactive metal.

Heretofore, a process for activating aluminum by adding to the alkylaluminum compound a small amount of alkali metal, alkaline earth metal or their oxides, hydroxides, etc. and heating aluminum under pressure by hydrogen is known (U.S. Pat. No. 2,892,738), but said prior art process has such a disadvantage that the activation time is prolonged. Further, a process for activation by heating aluminum or its alloy in the presence of lithium, sodium, potassium, magnesium, calcium, aluminum and others having an alkoxy group or aroxy group is known (Japanese Pat. No. 487,801). Said prior art process is preferable, because the activation time can be considerably shortened, as compared with said other prior art processes.

As a result of various studies on processes for activating aluminum or its alloy used in the synthesis of alkylaluminum compounds, the present inventors have found that, when metallic copper or a copper compound is used together with some specific activating agent, a considerably excellent activation effect can be attained, as compared with the effect attained by any one of said well known processes for activation, though the metallic copper or the copper compound alone has no activation effect at all.

That is to say, an object of the present invention is to provide a process for activating aluminum or its alloy, where an alkylaluminum compound is prepared by subjecting aluminum or its alloy, an alkylaluminum compound and hydrogen, or aluminum or its alloy, an alkylaluminum compound, hydrogen and an olefin, to reaction, which comprises activating the raw material aluminum or its alloy in the presence of an activating agent comprising (1) a compound represented by the general formula, $R_2AlX$, wherein R represents an alkyl, aryl, aralkyl or alkaryl group, X represents a hydrogen atom, an alkyl, aryl, aralkyl, alkaryl, alkoxy, aroxy, aralkoxy or alkaroxy group or a halogen atom, (2) a metal selected from the Groups Ia and IIa of the Periodic Table or its compound, and (3) a metallic copper or its compound at a temperature of 70°–200° C.

Aluminum or its alloy can be used in the present invention as the raw material, irrespective of its shape or composition. Usually, pulverized or atomized aluminum powders, cutting aluminum pieces by lathe and drilling machine or aluminum drilling waste, etc. can be used. Further, an aluminum alloy containing silicon, iron, titanium, magnesium or the like can be used as an alloy.

The activating agent used in the present invention comprises (1) a compound represented by the general formula, $R_2AlX$, wherein R and X have the same meaning as defined above, (2) a metal selected from the Groups Ia and IIa of the Periodic Table, or its compound, and (3) a metallic copper or its compound. The compounds represented by the general formula, $R_2AlX$, as the first component, wherein R and X have the same meaning as defined above, include such trialkylaluminums, dialkylaluminum hydrides or arylaluminum compounds having 2 to 20 carbon atoms as triethylaluminum, triisobutylaluminum, trioctylaluminum, diethylaluminum hydride, diisobutylaluminum hydride, dioctylaluminum hydride, diethylphenylaluminum, diethyl-p-tolylaluminum, or such alkylaluminum halides having 2 to 20 carbon atoms as diethylaluminum chloride, dipropylaluminum chloride, diisobutylaluminum chloride, or dipropylaluminum bromide; or such alkoxides, aroxides, alkaroxides or aralkoxides of alkylaluminum or arylaluminum having an alkyl group or an aryl group having 2 to 20 carbon atoms as diethylaluminum ethoxide, diisobutylaluminum butoxide, dioctylaluminum octoxide, diethylaluminum phenoxide, diethylaluminum 2-phenylpropoxide, diethylaluminum p-tolyloxide or diphenylaluminum ethoxide. These compounds can be used alone or in a proper combination.

Further, the metal selected from the Groups Ia and IIa of the Periodic Table or its compound as the second component includes such metals as lithium, sodium, potassium, or calcium, such compounds as hydrides, hydroxides, carbonates, bicarbonates, oxides, chelate compounds or organic acid salts of lithium, sodium, potassium, magnesium, calcium, barium, etc., such compounds of lithium, sodium, potassium, magnesium, or calcium having, in one molecule, at least one alkoxy or aroxy group having 2–20 carbon atoms in one group, as ethoxysodium, isopropoxylithium, dinormalpropoxycalcium, tertiarybutoxypostassium, or dinormalbutoxymagnesium, etc. These compounds can be used alone or in a proper combination.

The metallic copper or copper compounds as the third component includes such copper compounds as cuprous chloride, cupric chloride, cuprous bromide, cupric bromide, cuprous iodide, cuprous oxide, cupric oxide, cupric sulfate, cupric nitrate, cupric hydroxide, cuprous cyanide, copper acetate, copper acetyl-acetonate, copper formate, copper naphthenate, copper octylate, copper oleate, copper stearate, copper oxalate, disodium copper ethylenediaminetetraacetate, etc. These compounds can be used alone or in a proper combination.

The present invention is characterized by using an activating agent comprising said three components, and in that case, the activation effect of an activating agent comprising said three components is higher than the effect of the activating agent comprising two of said three components.

The following procedure is suitable for activating the aluminum or its alloy: that is, aluminum or its alloy is heat-treated in the presence of the present activating agent comprising said three components. The activation temperature generally 70°–200° C., particularly 100°–170° C. If the activation temperature exceeds said upper limit, that is, 200° C., a portion of the activating agent undergoes thermal decomposition, and the activation effect is lowered. If the activation temperature is lower than said lower limit, that is, 70° C., the activation time is prolonged and therefore the lower activation temperature is not preferable.

The suitable amounts of the respective components of the activating agent are given below, on the basis of the aluminum or its alloy to be activated: it is desirable that the first component is 5% by weight or more, the second component is 0.001% by weight or more and the third component is 0.0001% by weight or more. These components of the activating agent can be added to the reaction system together after mixing these three components in advance or separately.

The activation time depends upon the raw material aluminum or its alloy and thus cannot be exactly defined, but satisfactory activation can be attained usually for more than 0.2 hour. It is desirable to carry out the activation in such a state that the aluminum or its alloy is sufficiently wet with the activating agent.

The activation can be also carried out in the presence of such an organic solvent as hexane, pentane, benzene, toluene, xylene, acetone, diphenylether, dipropylether, dibutylether, cyclohexane, etc. Further, the activation can be carried out more preferably under pressure with hydrogen. In the activation, other activating agent generally well known as the activating agent for aluminum or its alloy can be used.

The activated aluminum or its alloy obtained according to said procedure can be used as a raw material for the well-known production of dialkylaluminum hydride or trialkylaluminum from the alkylaluminum compound, aluminum or its alloy and hydrogen, or from the alkylaluminum, aluminum or its alloy, hydrogen and olefin.

Generally, the reaction of the alkylaluminum compound, aluminum or its alloy and hydrogen, or the reaction of the alkylaluminum compound, aluminum or its alloy, hydrogen and the olefin is carried out at a temperature of 50°–200° C., particularly 100°–150° C. and under a pressure of 10–300 kg./cm.², particularly 50–200 kg./cm.². However, in the present invention, it is possible to carry out said two-step process in the following one-step process. That is to say, first of all, aluminum or its alloy and the present activating agent or further an organic solvent are charged into a reactor, and then an alkylaluminum compound (the alkylaluminum compound used as the first component of the present activating agent can be used as a substitute because all the alkylaluminum compounds have an equivalent effect), and hydrogen or further an olefin are supplied to the reactor. The activation and the direct synthetic reaction of alkylaluminum compounds can be carried out in parallel by heating the reactor to 70°–200° C. The above-mentioned process is only for an illustrative purpose and can be modified in various manners.

It has been not clear yet whey the present activating agent has a considerably excellent effect, as compared with the well-known activating agent, but it is a surprising fact that the metallic copper or its compound, which has no activation effect at all when it is used alone or in a simple combination of other well known activating agent, can have such a considerably excellent activation effect when combined with the specific components as defined above. By using the present activating agent, the activation time can be considerably shortened, and the fluctuation in the activation effect encountered in the conventional activating agent can be overcome. Therefore, the present invention has an industrially important value.

Now, the present invention will be explained, referring to examples, but will not be restricted thereto.

EXAMPLE 1

27 g. of aluminum lathe scraps and an activating agent as shown in Table 1 were charged into an autoclave having a 1-l. capacity replaced with a nitrogen gas and heated to 150° C. with stirring under pressure with hydrogen and kept at that temperature for two hours, whereby aluminum was activated. After the activation, the autoclave was cooled to room temperature and the activating agent was taken out of the autoclave.

Then, 100 g. of triisobutylaluminum and 130 g. of isobutylene were charged into the autoclave and the autoclave was heated to 140° C. with stirring, and the reaction pressure was kept at 100 kg./cm.² by supplying hydrogen thereto. The reaction was continued for 6 hours. After the completion of the reaction, the autoclave was cooled to room temperature and the content was taken out of the auoclave after the gas was vented from the autoclave.

The weight of aluminum residue was weighed to determine as the conversion of aluminum. The result is shown as the conversion in the table.

As is clear from the table, the conversion was far better when the present activating agent was used as in Test Run No. 5–12, then when proper combinations of two components of the constituents of the present activating agent were used as in Test Run No. 1–4.

TABLE

| Test run No. | Activating agent (1)[1] | Amount added, g | (2)[2] | Amount added, g. | (3)[3] | Amount added, g. | Conversion of aluminum, percent | Remarks |
|---|---|---|---|---|---|---|---|---|
| 1 | Triisobutylaluminum | 100 | Ethoxypotassium | 0.50 | | | 30.2 | Comparative Example. |
| 2 | Diisobutyl aluminum bromide | 100 | Tert-Butoxy potassium | 0.50 | | | 28.5 | Do. |
| 3 | Triisobutyl aluminum | 100 | | | Cupric chloride | 0.040 | 3.0 | Do. |
| 4 | (4) | | Ethoxysodium | 0.50 | do | 0.040 | 15.8 | Do. |
| 5 | Triethylaluminum | 100 | Metallic sodium | 0.25 | do | 0.040 | 56.4 | |
| 6 | Diisobutylaluminum hydride | 100 | Calcium hydride | 0.50 | do | 0.040 | 49.1 | |
| 7 | Tripropylaluminum | 100 | Diethoxymagnesium | 0.70 | Metallic copper | 0.020 | 50.7 | |
| 8 | Triisobutyl aluminum | 100 | Ethoxysodium | 0.50 | Cupric oxide | 0.025 | 60.0 | |
| 9 | Diisobutyl aluminum hydride | 100 | Lithium hydride | 0.20 | Copper naphthenate | 0.310 | 52.3 | |
| 10 | Trioctylaluminum | 100 | Potassium chloride | 0.50 | Copper acetylacetonate | 0.073 | 57.2 | |
| 11 | Diethylaluminum chloride | 100 | Calcium acetate | 0.50 | Cupric nitrate | 0.042 | 47.3 | |
| 12 | Diethylaluminum phenoxide | 100 | Sodium carbonate | 0.50 | Copper stearate | 0.100 | 54.5 | |

[1] Alkylaluminum compound.
[2] Metal of Groups Ia and IIa of the Periodic Table or its compound.
[3] Metallic copper or its compound.
[4] Xylene 100 g.

EXAMPLE 2

33.8 g. of lathe scraps of an alloy consisting of 80% by weight of aluminum and 20% by weight of silicon and an activating agent consisting of 100 g. of triisobutylaluminum, 0.5 g. of butoxypotassium and 0.040 g. of cupric chloride were charged into an autoclave having a 1-l. capacity replaced with a nitrogen gas, and the autoclave was kept at 130° C. for 2 hours with stirring under pressure with hydrogen, whereby aluminum alloy was activated. After the activation, the content was cooled to room temperature and the activating agent was taken out of the autoclave. Then, 60 g. of triisobutylaluminum and 130 g. of isobutylene were charged into the autoclave, and the autoclave was heated to 120° C. with stirring, and the reaction pressure was kept to 100 kg./cm.$^2$ by supplying hydrogen thereto. The reaction was continued for 4 hours. After the completion of the reaction, the autoclave was cooled to room temperature and the content was taken out of the autoclave after the gas was vented from the autoclave. Then, the weight of metal residue was weighed to determine the conversion of aluminum. As a result, the conversion was 82.0%.

For comparison, the reaction was carried out in the same manner as above, except that 100 g. of triisobutylaluminum and 0.8 g. of butoxypotassium were used as the activating agent. As a result, the conversion was 40.5%.

EXAMPLE 3

27 g. of aluminum powders, an activating agent consisting of 100 g. of triisobutylaluminum, 0.30 g. of sodium hydride and 0.10 g. of copper naphthenate, and 130 g. of isobutylene were charged into an autoclave having a 1-l. capacity replaced with a nitrogen gas, and the autoclave was heated to 150° C. with stirring. The reaction pressure was maintained at 100 kg./cm.$^2$ by supplying hydrogen thereto and the reaction was continued for 6 hours. After the completion of the reaction, the autoclave was cooled to room temperature, and the content was taken out of the autoclave after the gas was vented out of the autoclave. The weight of the aluminum residue was weighed to determine the conversion of aluminum. As a result, the conversion was 95%.

For comparison, the reaction was carried out in the same manner as above, except that 100 g. of triisobutylaluminum and 0.30 g. of sodium hydride were used as the activating agent. As a result, the conversion was 67%.

What is claimed is:

1. A process for activating aluminum or its alloy, which comprises heating aluminum or its alloy at a temperature of 70°–200° C. in the presence of an activating agent comprising (1) at least 5% by weight of a compound represented by the general formula, R$_2$AlX, as the first component, wherein R represents an alkyl, aryl, aralkyl or alkaryl group and X represents a hydrogen atom, an alkyl, aryl, aralkyl, alkaryl, alkoxy, aroxy, aralkoxy or alkaroxy group or a halogen atom, (2) at least 0.001% by weight of a metal selected from the group consisting of lithium, sodium, potassium and calcium; or the compound selected from the group consisting of hydrides, hydroxides, carbonates, bicarbonates, or oxides of lithium, sodium, potassium, magnesium, calcium or barium; or potassium chloride; or calcium acetate or the compound of lithium, sodium, potassium, magnesium or calcium having, in one molecule, at least one alkoxy or aroxy group having 2 to 20 carbon atoms in one group as the second component, and (3) at least 0.0001% by weight of a metallic copper or its compound selected from the group consisting of halides, oxides, sulfates, nitrates, hydroxides, or cyanides, or a copper compound selected from the group consisting of copper acetate, copper acetylacetonate, copper formate, copper naphthenate, copper octylate, copper oleate, copper stearate, copper oxalate and disodium copper ethylenediaminetetraacetate as the third component on the basis of the aluminum or its alloy to be activated.

2. A process according to claim 1, wherein the heating is carried out at 100°–170° C.

3. A process according to claim 1, wherein the heating is carried out for at least 0.2 hours.

4. A process according to claim 1, wherein the activation is carried out in the presence of an organic solvent.

5. A process according to claim 4, wherein the organic solvent is hexane, pentane, benzene, toluene, xylene, acetone, diphenylether, dipropylether, dibutylether or cyclohexane.

6. A process according to claim 1, wherein the activation is carried out under pressure with hydrogen.

7. A process according to claim 1, wherein the aluminum is pulverized or atomized aluminum powders, cutting aluminum pieces by lathe and drilling machine or aluminum drilling waste.

8. A process according to claim 1, wherein the alloy is an aluminum alloy with silicon, iron, titanium or magnesium.

9. A process according to claim 1, wherein the first component is such trialkylaluminums and dialkylaluminum hydrides having 2 to 20 carbon atoms as triethylaluminum, triisobutylaluminum, trioctylaluminum, diisobutylaluminum hydride, or dioctylaluminum hydride, or dialkylaluminum hydride, or such alkylaluminum halide having 2 to 20 carbon atoms as diethylaluminum chloride, dipropylaluminum chloride, diisobutylaluminum chloride or dipropylaluminum bromide, or such alkylaluminum alkoxides or alkylaluminum aroxides having an alkyl group or an aryl group having 2 to 20 carbon atoms as diethylaluminum ethoxide, diisobutylaluminum butoxide, dioctylaluminum octoxide, or diethylaluminum phenoxide.

10. A process according to claim 1, wherein the third component is selected from the group consisting of cuprous chloride, cupric chloride, cuprous bromide, cupric bromide, cuprous iodide, cuprous oxide, cupric oxide, cupric sulfate, cupric nitrate, cupric hydroxide, cuprous cyanide, copper acetate, copper acetylacetonate, copper formate, copper naphthenate, copper octylate, copper oleate, copper stearate, copper oxalate and disodium copper ethylenediaminetetraacetate.

11. A process for manufacturing alkylaluminum compounds, which comprises reacting a member selected from the group consisting of aluminum and aluminum alloys with hydrogen, and a member selected from the group consisting of trialkylaluminum, dialkylaluminum hydride, alkylaluminum halide and alkylaluminum alkoxide with or without an olefin in the presence of an activating agent comprising (1) at least 5% by weight of a compound represented by the general formula, R$_2$AlX, as the first component, wherein R represents an alkyl, aryl, aralkyl or alkaryl group and X represents a hydrogen atom, an alkyl, aryl, aralkyl, alkoxy, aroxy, aralkoxy alkaryl or alkaroxy group or a halogen atom, (2) at least 0.001% by weight of a metal selected from the group consisting of lithium, sodium, potassium and calcium; or the compound selected from the group consisting of hydrides, hydroxides, carbonates, bicarbonates, or oxides of lithium, sodium, potassium, magnesium, calcium or barium; or potassium chloride; or calcium acetate of the compound of lithium, sodium, potassium, magnesium or calcium having, in one molecule, at least one alkoxy or aroxy group having 2 to 20 carbon atoms in one group as the second component, and (3) at least 0.0001% by weight of a metallic copper or its compound selected from the group consisting of halides, oxides, sulfates, nitrates, hydroxides, or cyanides, or a copper compound selected from the group consisting of copper acetate, copper acetylacetonate, copper formate, copper naphthenate, copper octylate, copper stearate, copper oxalate and disodium copper ethylenediamine tetraacetate as the third component on the basis of the aluminum or its alloy to be activated.

References Cited
UNITED STATES PATENTS

| | | | |
|---|---|---|---|
| 3,576,832 | 4/1971 | Becker | 260—448 A |
| 3,381,024 | 4/1968 | Toyoshima et al. | 260—448 A |
| 3,393,217 | 7/1968 | Ichiki et al. | 260—448 A |
| 3,402,190 | 9/19968 | Toyoshima et al. | 260—448 A |

HELEN M. S. SNEED, Primary Examiner

U.S. Cl. X.R.

75—68